(No Model.)

3 Sheets—Sheet 1.

H. R. MATHIAS.
EXCELSIOR MACHINE.

No. 267,010.

Patented Nov. 7, 1882.

Witnesses:

Inventor:
Henry R. Mathias
By Jeptha Garrard
his Atty (No Model.)  3 Sheets—Sheet 2.
H. R. MATHIAS.
EXCELSIOR MACHINE.
No. 267,010.  Patented Nov. 7, 1882.
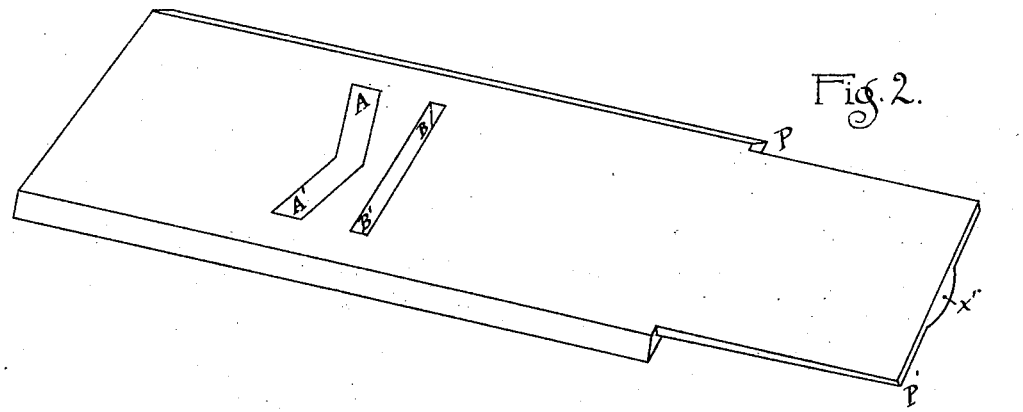
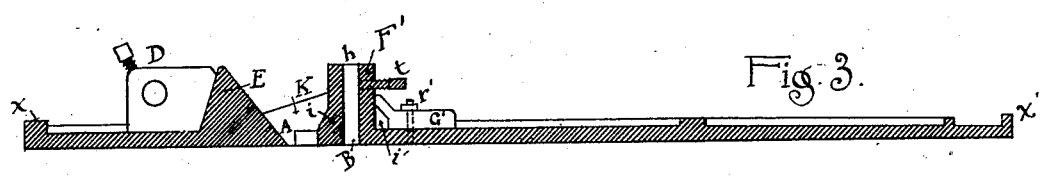
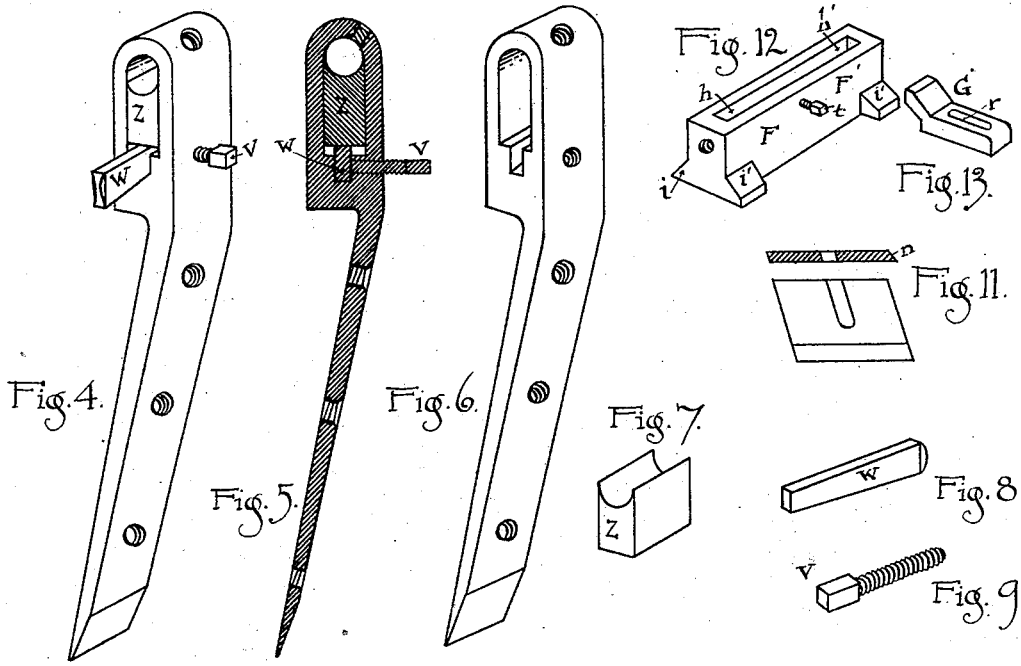
Witnesses:
Inventor:
Henry R. Mathias
By Jeptha Garrard
his atty

UNITED STATES PATENT OFFICE.

HENRY R. MATHIAS, OF ATHENS, OHIO.

EXCELSIOR-MACHINE.

SPECIFICATION forming part of Letters Patent No. 267,010, dated November 7, 1882.

Application filed March 27, 1882. (No model.)

*To all whom it may concern:*

Be it known that I, HENRY R. MATHIAS, of the town of Athens, in the county of Athens and State of Ohio, have invented a certain new and useful Improvement in Excelsior-Machines for Making Shavings; and I do hereby declare the following to be a full, clear, and exact description of the same, reference being had to the accompanying drawings, forming part of this specification, in which—

Figure 1:
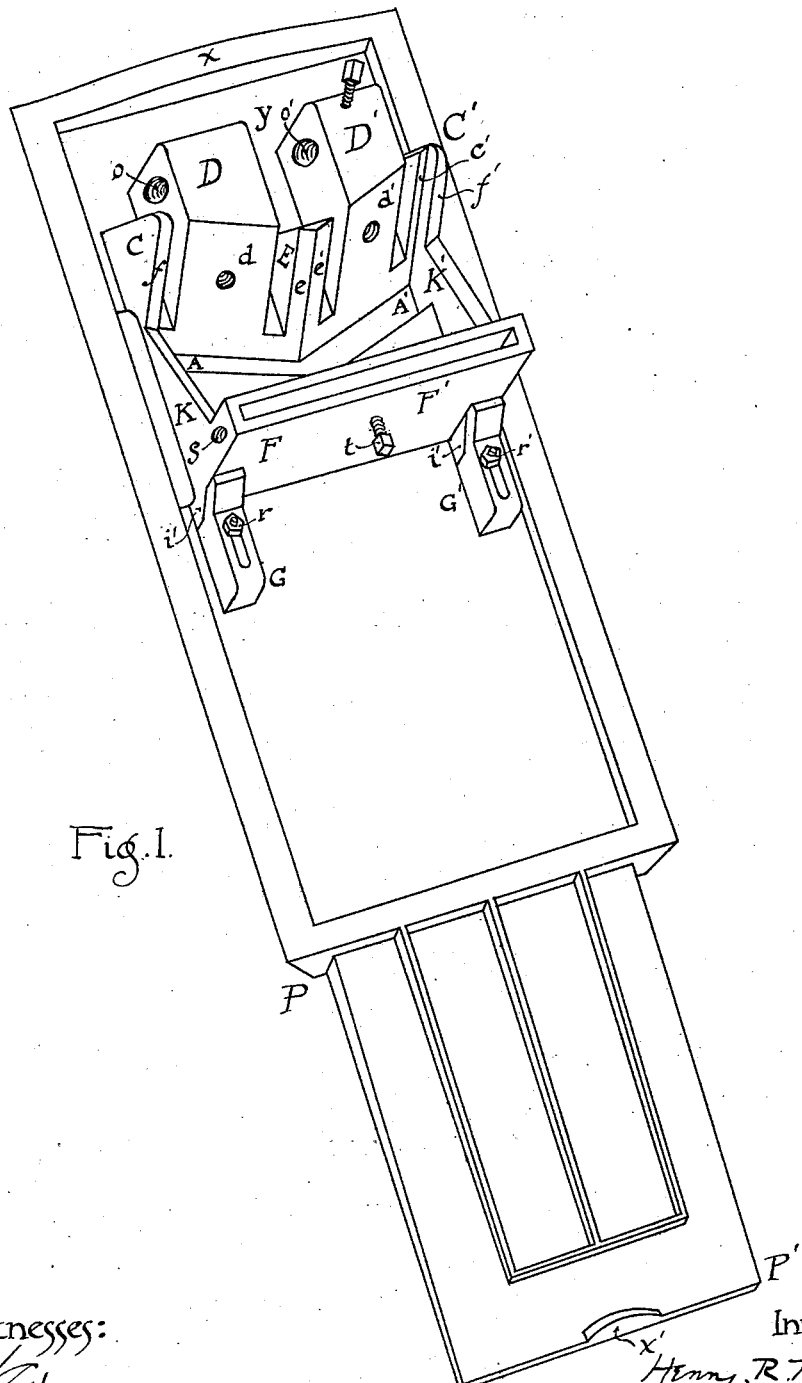
Figure 10:
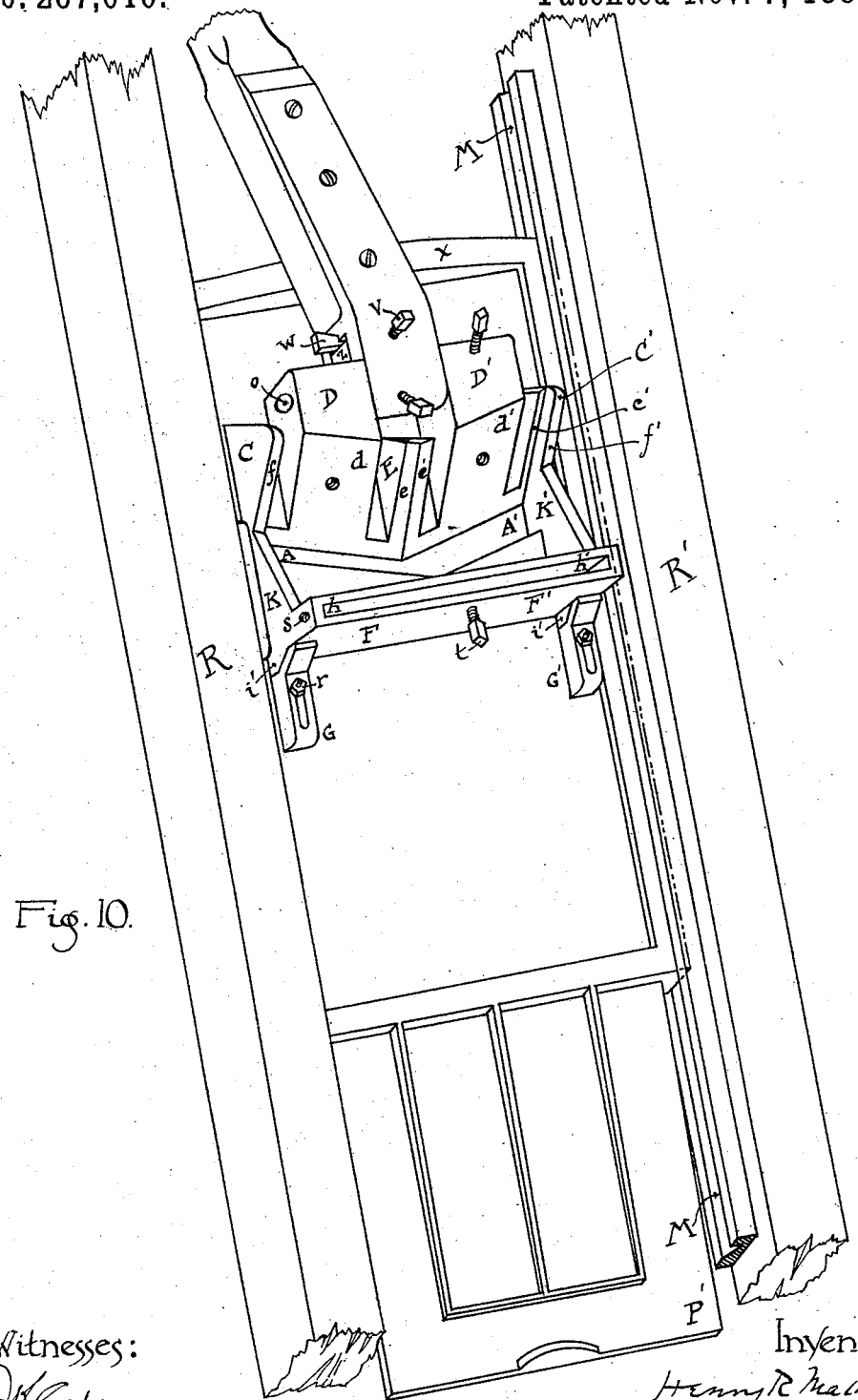

Figure 1 shows a perspective view of the back of knife-plate with detachable spur-block in position. Fig. 2 shows a perspective view of the face of knife-plate with apron. Fig. 3 shows a longitudinal section through the center of knife-plate and detachable spur-block on the line $x\ x'$, shown in Fig. 1. Fig. 4 is a general perspective view of the strap-joint or journal-bearing for connecting-rod, with prolongation for attachment to the connecting-rod, and with adjustable bearing-block, key, and set-screw in position. Fig. 5 is a longitudinal section through the center of the same. Fig. 6 is a view of the same journal-bearing with the adjustable bearing-block, the key, and the set-screw detached. Figs. 7, 8, and 9, respectively, are detached views of the said adjustable bearing-block, forming part of the journal-bearing, and the wedge-shaped key, and the set-screw for holding the same in place. Fig. 10 shows a general perspective view of the parts of such machine containing my improvements, viewed from the rear of the machine, and with the knife-plate and detachable spur-block, the adjustable journal-bearing, and connecting-rod in operative position, and with the knife-plate in position in its guides, and all held in the framework R R'. Fig. 11 shows a view in elevation of one of the plane-bits, and also a view of a cross-section of the same, exhibiting the beveled side at $n$. Fig. 12 is a detached view of the detachable spur-block, and Fig. 13 is a detached view of the clamp for holding the spur-block in position.

Similar letters of reference in the several figures denote the same parts.

My invention relates to excelsior-machines having a reciprocating knife-plate and slitting knives or spurs separate from the shaving-knives, for making the shavings known in commerce as "excelsior," and used for stuffing mattresses, for upholstering, for packing, and for other like purposes.

In the accompanying drawings, A A' represent the angled slot or opening through which two knives or plane-bits (each equal in breadth to one-half the length of the slot) project sufficiently to give their edges the proper bite on the block of wood fed to the face of the knife-plate.

B B' represent the straight opening or slot through which the proper number of spurs or knives, held in the spur-block F F', Fig. 1, and separated by the proper space-blocks, protrude their edges a like distance on the face of the knife-plate, but each with its cutting-edge in a line parallel to the side of the knife-plate, and serving to cut a row of parallel incisions in the face of the block fed to the machine, and just in advance of the operation of the plane-bits in A A', thus controlling the width of the shaving to be taken off and curled by the operation of the plane-bits.

C and C', D and D', and E are raised lugs, whose faces $c$ and $c'$, $d$ and $d'$, and $e$ and $e'$ make the same angle to the side of the knife-plate that is made by the corresponding side of the slot A A', said faces being merely an extension in the same plane of the upper and beveled edge of the slot A A', said bevel being such as the proper action of the plane-bits requires, and said faces serving as a bed to receive or support the two plane-bits, and to which bed the bits are fastened by set-screws in the holes shown on $d\ d'$. These lugs are thus separated for the purpose of dispensing with the intervening and unnecessary metal, thus materially lessening the weight of the knife-plate. Also, the lugs C and C' are each provided on the outer edge of the face with a flange, $f f'$, serving to brace the plane-bits on either side and to prevent any lateral displacement of the same, and said lugs D and D' also serve to hold in the holes $o$ and $o'$ the two ends of the journal to which the strap-joint or journal-bearing of connecting-rod (shown in Figs. 4, 5, and 6) is attached, fitting in the space $y$ between the two lugs D and D', the connecting-rod serving to communicate a reciprocating motion to the knife-plate working in its guides M M, Fig. 10.

In Figs. 4 and 5, $z$ is the adjustable bearing-block. (Shown detached in Fig. 7.) W is the wedge-shaped key, (shown detached in Fig. 8,) and V is the set-screw. (Shown detached in Fig. 9.) I use two knives, which are ordinary plane-bits, as shown in Fig. 11, each having one side beveled, as shown at $n$, which beveled sides meet and fit accurately together on the center line of the lug E, when the knives are placed in position and fastened to their bed by the set-screws in $d$ and $d'$.

F F' is a movable spur-block, having an opening, $h h'$, corresponding in size to the opening B B' in the knife-plate. The knives or spurs are fastened in the opening $h h'$, with suitable space-blocks between them, held by means of set-screws at $s$ and $t$, and the movable spur-block itself is held in position on the back of the knife-plate, with the opening $h h'$ accurately over the slot B B', by means of suitable beveled feet, $i i'$, Fig. 12, of which the foot $i$ fits accurately into a corresponding recess under an ear or lug, $k$, forming part of the back of knife-plate, and the foot $i'$ is clamped firmly by the movable ears or lugs G G', which clasp the feet $i i'$, as shown in Fig. 1, and are held by set-screws passing through an elongated opening, $r$, in the foot of the lug, so that when the set-screws are loosened the lugs may be slid back and the spur-block released without removing the lugs from the knife-plate.

The part P P' is a part extension or apron of the knife-plate not working in the guides.

My invention consists—

First. In making the bit-slot A A' so that the two halves of the same form an angle with each other at the center of the knife-plate, and so that the shaving-edges, when placed in position, form an angle with each other. In other machines the bit-slot A A' is but one straight slot, either on a line at right angles to the side of knife-plate or else on a diagonal at a greater or less angle to the side; but in the first case, when the slot is at right angles, the shaving produced is simply a long flat shaving without any spiral curl whatever, and is but a very inferior article for the purposes intended; and in the second case, of a diagonal slot, though the shavings produced then have the form of an elongated spiral curl, which is the form desired in excelsior, yet the shavings all curl in the same direction, and are more liable to mat than when produced on my machine with two cutting-edges at an angle to each other, whereby the shavings produced by one knife curl in one direction and those by the other knife curl in the opposite direction; also, in the latter case, of one diagonal slot, the working strain is thrown almost entirely upon one of the guides in which the knife-plate works, as shown at M in Fig. 10, and this produces a proportionately-greater wear upon that guide and edge of the knife-plate working therein, whereas in my machine one of the effects of placing the two knives at an angle is that this tendency of one knife to force the knife-plate more strongly against one guide is counteracted by the tendency of the other knife to force the knife-plate just as strongly against the other guide, thus both distributing the wear equally upon the two guides and preventing a jam. A further mechanical advantage of my angled slot A A' is that the length of the operative stroke necessary to pass the entire cutting-edge of the knives past a given point is reduced by one-half as compared with the stroke necessary for the same purpose in the case of one straight diagonal slot making the same angle to the side, and having a cutting-edge equal to the combined length of the edges in my two knives.

Second. In the employment of two knives or plane-bits instead of one, the same being so placed that their cutting-edges form an angle with each other at the center of the knife-plate.

I do not claim broadly the apron P P', the same having been used in other machines for a similar purpose; nor the spurs as held in the detachable spur-block; nor the detachable spur-block itself, although the same is my own invention; nor the strap-joint or adjustable journal-bearing, as herein described, the same being a well-known mechanical device.

Having now described my invention, what I claim as new, and desire to secure by Letters Patent, is—

1. In an excelsior-machine, the combination of a detachable spur-block with a double-bladed angled shaving-edge and a strap-joint having an adjustable bearing-block, substantially as described.

2. In an excelsior-machine, the combination of a knife-plate having an apron with a detachable spur-block, a double-bladed angled knife, and a strap-joint with adjustable bearing-block, substantially as described.

The foregoing specification of my invention signed by me this 14th day of March, A. D. 1882.

HENRY R. MATHIAS.

Witnesses:
JOHN D. GALLAGHER,
JEPTHA GARRARD.